United States Patent [19]
Hofer

[11] 3,935,697
[45] Feb. 3, 1976

[54] MULTIPOSITION DETACHABLE COMBINE TOOTH DEVICE

[76] Inventor: Walter David Hofer, 939 11th St. South, Lethbridge, Alberta, Canada

[22] Filed: Nov. 25, 1974

[21] Appl. No.: 526,974

Related U.S. Application Data

[63] Continuation of Ser. No. 417,970, Nov. 21, 1973.

[52] U.S. Cl. .............................. 56/400; 56/400.21
[51] Int. Cl.² ......................................... A01D 77/00
[58] Field of Search .......... 56/400, 400.21, 291, 98; 198/198, 200, 168, 172, 173, 174, 175, 176

[56] References Cited
UNITED STATES PATENTS

| 67,705 | 8/1867 | Ball | 56/400 |
|---|---|---|---|
| 1,189,036 | 6/1916 | Austin | 198/175 |
| 2,989,835 | 6/1961 | Johnston | 56/400 |
| 3,344,908 | 10/1967 | Hofer | 198/198 |

FOREIGN PATENTS OR APPLICATIONS

| 198,240 | 5/1923 | United Kingdom | 56/400 |

*Primary Examiner*—Louis G. Mancene
*Assistant Examiner*—James D. Hamilton

[57] ABSTRACT

In a preferred embodiment there is provided combine tooth having a tooth shaft and at the base of the shaft having a unitary continuous flange extending transversely to the longitudinal axis of the shaft, with a distal portion of the shaft extending substantially angularly laterally from an intermediate bend point, and there is additionally provided for combination with the tooth a combine belt-mountable base strip for mounting on top of the combine belt fixedly, the base strip having at each of opposite ends thereof a through aperture, one aperture at each of opposite ends, the holes each of hole diameter receivable of the tooth shaft and the structure of the base strip defining continuous with each hole a narrowed slot extending rearwardly having a slot width slightly less than the diameter of the tooth shaft through which slot the tooth shaft is pressable into the hole continuous therewith, and the underface of the base strip including spaced-apart ridges, there being a separate set of the spaced-apart ridges for each hole located at each of opposite spaced-apart ridges for each hole located at each of opposite ends of the base strip, the downwardly extending spaced-apart ridges defining side and front walls to a space receivable of the tooth's base flange between an under-face of the strip adjacent the hole and the upper face of the combine belt on which the base strip is mounted, and the base strip additionally including at each of opposite ends thereof attaching structure such as holes therethrough receivable of a screw or rivet or the like, each base flange mounting space's side and front walls defining a multisided female structure, and the base flange being peripherally shaped as multisides mateable at any of variable positions within the mounting space mountable fixedly against rotary motion of the tooth shaft.

10 Claims, 13 Drawing Figures

MULTIPOSITION DETACHABLE COMBINE TOOTH DEVICE

This invention and application for patent is a continuation in part of the parent application U.S. Ser. No. 417,970 filed Nov. 21, 1973.

This invention relates to a combine tooth mounting structure with a detachable tooth as a part thereof.

BACKGROUND TO THE INVENTION

Prior to the present invention there has existed a major problem in the shearing of teeth from the combine belt during the operational use thereof in combining, and the problem has been further complicated by the notorious difficulty in replacing such teeth, as well as the cost of replacing both teeth in the double-tooth mounting type arrangement. There additionally is the consideration of retaining high efficiency in the nature of the teeth while hopefully avoiding these problems.

For any structure a part of a multi-pieced tooth mounting arrangement, strength sufficient for long durability is a major need, prior teeth being characterized by too many and too frequent shearing of teeth, as well as the fracturing of any base structure.

It is also a problem with mounting structure for combine teeth in so far as entangled grass and/or weeds which quickly render adjacent teeth ineffectual in the combining operation.

Not only cost of the teeth are involved, but also heretofore the time lost from the combining operation, or otherwise the efficiency lost in the combining when the tooth is not promptly replaced when broken or fractured, add to the cost of overhead which cost must be passed on by higher prices.

For different types of grains and combining conditions, the length and angle of the teeth can have a major effect on the success or lack of success of efficient combining operation.

BROAD DESCRIPTION OF THE INVENTION

Objects of the present invention include the overcoming of one or more of the problems and difficulties of the type referred to above, together with the obtaining of novel advantages not heretofore available.

Another object is to obtain a novel mechanism of anchoring securably the respective one or more, particularly spaced-apart paired tine-teeth to a combine belt, while concurrently obtaining a flexibility which decreases the possibility of shearing tine fingers (teeth) while nevertheless retaining sufficient stiffness in the tine teeth as to retain a high level of operational efficiency.

Another object is to obtain a tine tooth mounting structure mountable onto an upper surface of a combine belt while providing improved durability to the mounting structure against fracture as well as improving strength needed for securely holding the tine tooth itself.

Another object is to obtain a tine tooth mounting structure which avoids collection of miscellaneous debris.

Another object is to obtain a mateable male-female base and tine tooth arrangement for quick and simple replacement of tine teeth by simple snap-in arrangements.

Another object is to provide a mateable male-female base and tine tooth arrangement making possible optional alternate angles of positioning the tine tooth fixedly within the base structure.

Other objects become apparent from the preceding and following disclosure.

One or more objects of the present invention are obtained by the invention as defined herein.

Broadly the invention includes a combination of a combine tine tooth and a mounting base strip therefor in which the intermediately bent tooth shaft includes a unitary base flange continuous with the proximal end thereof with the flange extending transversely laterally to a longitudinal axis of the shaft around the shaft radially outwardly therefrom preferably, and the base strip toothmounting element includes mounting structure for mounting the base strip substantially flushly along an upper surface of a combine belt and defining at opposite ends of the base strip between upper and lower faces of the base strip through holes of a size receivable of the shaft of the combine tine tooth, and extending rearwardly from each of the holes at opposite ends of the base strip there being continuous for each hole respectively a narrowed open-ended slot through which the combine tooth shaft is pressibly movable therethrough for snapping into the hole continuous therewith, while the base flange of the shaft moves along beneath the overhanging lower surface of the base strip on each of opposite sides of the open-ended slot during the snap-in movement and in the snapped in state the base flange of the shaft extending radially outwardly from the shaft beneath the lower face of the base strip surrounding the hole into which the shaft is snapped.

In various preferred embodiments of the invention, the lower face of the strip and the base flange each respectively are shaped for mating and interlocking relationships with one-another when the shaft is in the snapped-in state within the hole such that the shaft of the combine tine tooth is held firmly against rotary turning movement around the longitudinal axis of the proximal end of the tine tooth in its mounted state, the outer peripheral edge of the base flange being preferably multisided having a plurality of serially adjacent side portions of equal length to one-another corresponding to identically shaped female structure of the underface of the base strip, or equivalent shaped structure thereof for locking receiving engagement with the multisided periphery of the base flange such that the tine tooth and its integral base flange may be positioned in any of several alternate positions in a locked state resulting in the distal end of the combine tine tooth being positionable in any of several alternate laterally extending directions as might be desired by the combine operator for varying conditions and/or grain and efficiency of combine operation, in the opinion of the individual combine operator. Also, the combine base strip of the invention preferably is for the mounting of dual tine teeth bilaterally with one at each of opposite ends within the respective holes at the opposite ends thereof, as noted above. In a further preferred embodiment, there is on the underface of the base strip downwardly extending wall structure defining the side walls and forward wall(s) of the base flange-receiving and mounting space for receipt fixedly of the base flange of the combine tine tooth, with the structure being in the nature of downwardly-extending spaced-apart ridges on each of opposite sides of each hole and of each open-ended slot continuous with the hole respectively. The width of the downwardly extending ridges each respectively is of sufficient predetermined width as to add substantial strength and sturdiness and durability to the supporting structure for the individual base flange and for the overall base strip. The downwardly-extending spaced-apart ridges are positioned and shaped to define the male and multi-sided peripheral inner wall structure matably receivable of the plurality of peripheral sides of the multisided peripheral edge of the base flange when the base flange is in the inserted state within the mounting space defined between the respective ones of the spaced-apart downwardly extending ridges for each hole and continuous open-ended slot thereof respectively. It should be noted that the space rearwardly of the hole on each of opposite sides of the rearwardly-extending open-ended slot is devoid of downwardly-extending structure to the extent that such would interfere with sliding insertion of the base flange of the combine tine tooth during the insertion of the shaft of the tine tooth through the open-ended slot from a rearward direction toward a forwardly located hole continuous with the open-ended slot. However, it is within the acceptability of the invention for the wall to include a slightly upwardly directed recess for receiving the base flange as the tine tooth shaft adjoining the base flange is slid into the hole after passing through the open-ended slot. It is further preferred embodiment there is an additionally downwardly extending wall structure at least at a rearward and forward edge each respectively at locations between the inner one of the downward-extending wall of paired downwardly-extending ridges of each end such that between the spaced-apart one such wall at each of opposite ends of the strip there extends forward and rearwardly located walls extending therebetween such that there is prevented the collection of debris in the intermediate space located between the spaced-apart tine tooth shaft-receiving holes one at each of opposite ends of the base strip beneath the strip when the base strip is mounted with its lower face and downwardly extending ridges therefrom substantially flushly with an upper face of the combine belt. Typically each of opposite ends of the base strip include screw holes or brad holes or other attaching holes through which the attaching element itself is durably lockable of the base strip either detachably or permanetly fixedly onto the upper face of the combine belt. Accordingly, upon the fracturing or shearing of either of the tine teeth at each of opposite ends of the strip, the base flange and the remaining portion of the tine tooth shaft may be easily removed by rearwardly pressing the same to slide out from beneath the lower face of the base strip with the shaft of the tooth being pressed through the narrowed open-ended slot.

It is apparent from the preceding discussion that the material out of which the base-flange is composed at least in the vicinity of the narrowed open-ended slot must be substantially semiflexible (or semi-rigid) sufficiently that the structure edges of the open-ended slot are yieldable to permit the pressing slidably inwardly and outwardly of the shaft of the tine tooth toward and away from the hole respectively in the insertion and withdrawal of the same to and from its mounted state in the hole. Preferably the entire base strip and also preferably the tine tooth and base flange thereof are of semiflexible material to permit a reasonable degree of flexing thereby avoiding shearing or fracturing either or both under severe conditions such as the striking of rocks or other solid material or other conditions that might otherwise destroy or damage the tooth or the base strip itself. Although such materials of a flexible nature may be of metal of a yieldable semi-flexible type, preferably the combine tine tooth and the base strip respective one or both are of a plastic material in part or in whole, such as polyvinyl chloride, fiberglass, polypropylene, or the like. In particular, polypropylene is very tough and sturdy material under a wide range of temperatures and becomes toughened to a greater extent as it is continually flexed or bent, and is therefore a preferred composition out of which each of the combine tine tooth and the mounting base strip of the present invention are composed.

The invention may be better understood by making reference to the Figures as follow.

THE FIGURES

DETAILED DESCRIPTION OF THE INVENTION

Figure 1:
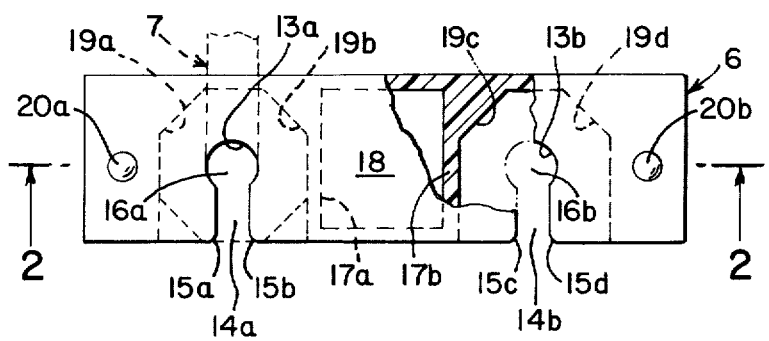
FIG. 1 illustrates an elevation plan view in partial cut-away, of a preferred embodiment of the present invention for the base strip element, also showing in phantom at one end there of the mounting position typically of a combine tine tooth of the present invention, and showing in phantom a portion of the combine belt on which the base strip is mounted.

It is noted that there are basic similarities of the tine tooth's proximal end of the tine tooth shaft and of the base flange intimately continuous therewith, in comparison to that of the parent patent application of which this invention is a continuation-in-part, and which parent application is hereby incorporated by reference in its entirety as a part of this disclosure. Some of the differences of the present tine tooth shaft and base flange for the present invention, are that the elongated part of the tooth shaft is rounded at the base and remains preferably substantially round throughout its length and is not engageable as a part of the locking structure along the distal portion of the shaft above the intermediate shaft bend therein, as well as in a preferred embodiment, the base flange of the present combine tine tooth being multisided of equal side lengths such as hexagonal, pentagonal, or the like, with the base flange having an under-face structure shaped for lockingly receiving the multi-sided base flange at any of various angles of the distal end of the shaft, making it possible to lock-in the combine tine tooth in various positions to alter and/or improve efficiency and/or adaptability to varying combining conditions and/or grains being combined, at the option of the operator by simple and quick adjustment before and/or during the combining operation. The base strip itself preferably includes the raised edges on the sides of the underface with the raised portion of the ridges being of sufficient width as to add sufficient strength for improved durability and longivity when rivited or otherwise attached by screw or other attaching elements to the combine belt's upper face. The raised edge surrounding the central portion of the base (as viewed from an undersied thereof) — i.e. the downwardly-extending walls, surrounding the central portion of the base between the holes located at the opposite ends for receiving the teeth shafts, with the raised edge including forwardly and rearwardly located raised edges, prevent grain, straw and the like from lodging beneath the base strip during combining operations. The rearwardly extending slots for the mounting of the teeth therethrough slidably, are preferably each tapered toward the center with an enlarged area in the center in the nature of the shaft-receiving hole continuous with the open-ended slot at its inner forward end. The base strip may be rivited right onto the belt itself to remain stationary for all time, but is preferably detachably mounted by a snap-in type rivit such that if and when the base strip should become fractured or otherwise damaged or worn, it may be easily removed. Some of the advantages are that the base strip may be attached by machine and may remain stationary on the belt while the tine teeth thereof may be snapped-in or shapped-out easily and quickly for ease of replacing broken or worn teeth, no tools, nuts or bolts or great strength or skill being required. The slots are such that the pressure when applied to the rearward side portion of the tooth results in pressing the shaft slidably down the open ended slot into its locked state with the base flange sliding into its locked state, as the shaft slips from the flexed-back portions of the slot walls into the sized shaft-receiving hole.

In addition to those noted above, other materials out of which either or both of the tine tooth and/or base strip may be made include in whole or in part nylon-type material, polyethylene, or the like, and typical metal being spring-steel.

The preferred base flange shape is hexagonal in its peripheral and possibly upper shape, allowing the shaft of the tine tooth to be in any of several variable positions, as shown in the FIG. 6A through 6H embodiments. In each case, the combine tine tooth is held firmly in place by the edge peripheral wall faces of these embodiments in correspondingly shaped female receiving structures of the base strip beneath the hole and surrounding the hole, as defined by the downwardly-extending ridges, as indicated in phantom for the embodiments of the FIGS. 6A through 6H. Such allow the farmer to suit his own taste in regard to grain swath conditions, length of straw, and the height of the swather cut. He can simply remove and replace by reinsertion any one or more of the combine tine teeth at whatever angle(s) or combination of angles for the plurality of preferably paired combine tine teeth, that will in the operator's opinion will improve the efficiency and/or safety in the picking-up of grain in the combine operation as dependent upon the particular field and/or weather conditions.

FIGS. 1 through 6 all are directed to a common preferred embodiment having various preferred features as noted above, and are broadly discussed below without always making reference to a particular Figure.

Figure 2:
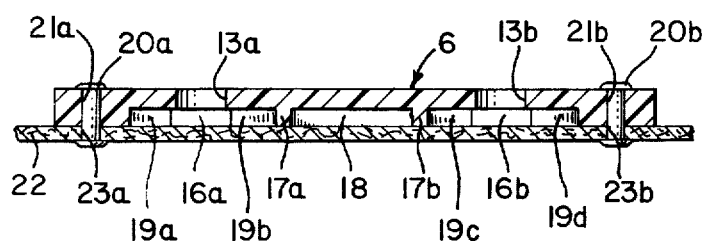
FIG. 2 illustrates a rearward cross-sectional side view of the embodiment of FIG. 1 as taken along lines 2—2 thereof.
Figures 3, 4, 5:
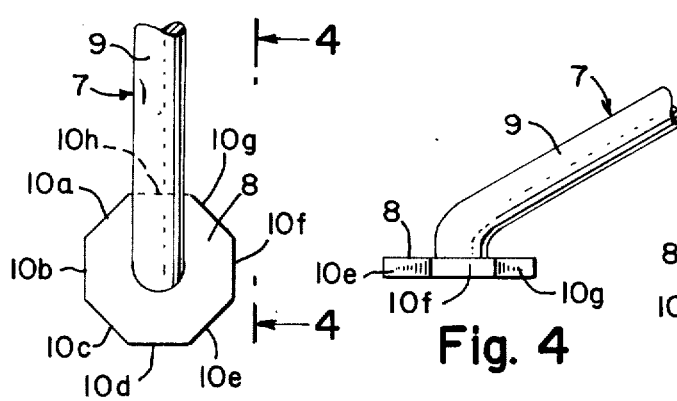
FIG. 3 illustrates and elevation plan view in an in-part view thereof of a preferred combine tine tooth with is shaft and base flange intimate therewith.
FIG. 4 illustrates a view of the combine tine tooth of FIG. 3, as viewed in side view along lines 4—4 of FIG. 3.
FIG. 5 illustrates a top, side perspective view of the preferred embodiment of the tine tooth of FIGS. 3 and 4.
Figures 6A, 6B, 6C, 6D:
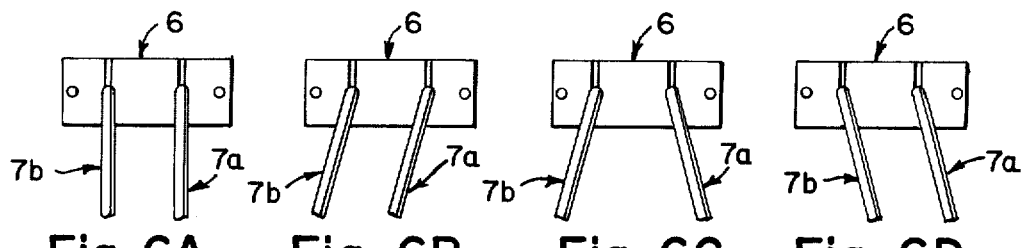
FIGS. 6A through 6H illustrate in elevation plan view variations and positions of the paired mounted tine teeth in view comparable to that of FIG. 1.
Figures 6E, 6F, 6G, 6H:
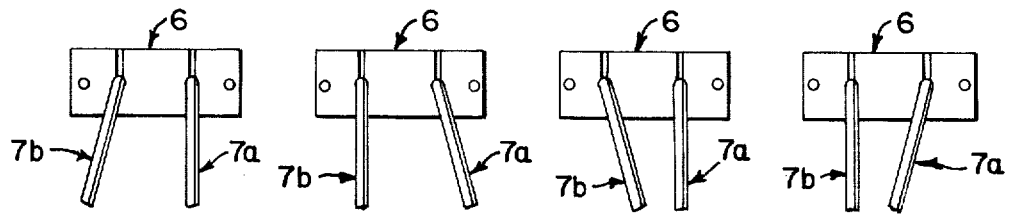

However, FIGS. 1, 2, and 6 disclose varying views of the mounting base strip and of the combine belt on which the strip is mounted, while FIGS. 3 through 5 are broadly directed to differing views of the combine tine tooth itself of the shaft thereof and its continuous integral base flange.

The base strip 6 is mountable at apposite ends thereof of a combine tine tooth 7, having continuous with a lower end of the proximal portion of the tine tooth shaft a base flange 8 extending transversely laterally to the logitudinal axis of the proximal portion of the shaft 9 of the tine tooth 7, with the peripheral radially outward edge faces of the base flange 8 existing as multisides such as side faces 10a, 10b, 10c, 10d, 10e, 10f, and 10g of a hexagonal shape for this particular preferred embodiment. The shaft 9 of the tine tooth 7 includes a proximal end 12 and a distal end 12', having a bend intermediate thereof at point 12'', and the distal end 12' extending angularly laterally as shown typically in FIGS. 4 and 5, with the distal end having additional preferred bend at point 11 thereby dividing the distal end portion 12' into portions 12a and terminal portion 12b respectively, with the terminal portion 12b extending more radially outwardly from the combine belt as shown in the Figures. The base strip 6 defines at opposite ends thereof combine tooth-receiving through-holes 13a and 13b respectively, with the base strip being shown in a mounted state on a combine belt shown in each of FIGS. 1 and 2 in an in-part view thereof, in elevation plan view in FIG. 1 and in side cross-sectional view in FIG. 2, the respective through-space holes 13a and 13b being respectively continuous with narrowed open-ended slots 14a and 14b respectively, with preferably the leading edges of the slot structure at the open end of each respective slot being gradually widened, preferably curved, as curved opening surfaces 15a and 15b, and 15c and 15d respectively.

In the cut--away view for the flange-receiving mounting space 16b, there is illustrated the female-defining receptacle wall 19c and also the serially adjacent wall 19c' and the wall thereafter serially adjacent thereto shown in phantom shown as wall 19b, against which three-sided forwardly-located walls typically base flange peripheral walls 10a, 10b, and 10f are pressed while the respective walls 10b and 10e are slidably confined between the female-defining 19e and 19e' when the proximal shaft portion 12 is snapped into the hole 13b retainingly.

The base flange mounting spaces 16a and 16b are better illustrated as located between downwardly extending ridges 17a and 17e respectively and 17b and 17f respectively. Free space 18 includes defining that space the forwardly and rearwardly located walls 17c and 17d which thereby totally complete the circumscribing of the space 18 preventing the catching and hanging-up of debris of various sorts when the lower face of the base strip and the downwardly-extending ridges thereof are mounted flushly against an upper surface of the combine belt. The interconnecting walls 17a, 17c, 17b, and 17d, also serve to strengthen the overall structure by virtue of the box-shaped structure thereby defined. It is noted that the ridges 17e and 17f located at opposite ends of the base strip's underface side of the base strip 6, are of a widened width as best viewed in each of FIGS. 1 and 2 such that structure thereby is made more sturdy, particularly this being important since the studs 20a and 20b respectively extend therethrough anchoring the base strip 6 to the combine belt 22. The brades (studs) 20a and 20b respectively extend through the mounting apertures 21a and 21b of the base strip 6, and are locked onto the belt by also extending through the combine belt apertures 23a and 23b respectively. FIGS. 6A through 6H disclose diagrammatically, variations in positioning paired combine tine teeth of the present invention having the multisided base flange for each respectively in the mounted states within base strips having base-flange mounting spaces of identical shapes in the receiving side and forward walls, in the nature identical to or similar to those described and illustrated in FIGS. 1 through 5.

It should be apparent that although the illustrations of the multi-sided base flange of the FIGS. 1 through 5 are of octagonal shape and also that the male receptacle of the base strip is as illustrated also octagonal in its forward portion, having three such walls but being devoid of such walls on the rearward direction through which space the base flange is slipped into position, but nevertheless other numbers of walls of the base flange and the corresponding shape for the base strip are contemplated as previously noted. Each of the FIGS. 6A through 6H also illustrate one or more variations of positions of respective ones of the individual pairs of teeth one relative to the other, diagrammatically.

It is within the scope of the present invention to make such variations, modifications, and substitution of equivalents as would be apparent to a person of ordinary skill.

I claim:

1. A combine detachable tooth device comprising in combination: a combine tooth having a central shaft and having a base flange extending transversely laterally to and unitarily continuous with the central shaft, the central shaft extending axially and being shaped to include a bend at a point intermediate of the shaft's axial length at a location in juxtaposition to and spaced a predetermined distance from and above the base-flange dividing the central shaft into a proximal portion of predetermined short length and a distal portion of predetermined long length, such that the distal portion of the shaft extends substantially laterally angularly from the proximal portion of the shaft; a semi-flexible base-strip element having upper and lower substantially flat faces extending in substantially parallel planes to one-another defining a through-space hole therethrough of a size and shape receivable of said proximal portion and further defining continuous with the through-space hole a narrowed open-ended slot of a width of predetermined width distance less than a narrowest diameter of the proximal portion such that the shaft may be pressed laterally through the narrowed open-ended slot to snap into the through-space hole, the base-strip element including attaching means for mounting thereof on a combine belt's upper face such that the base-flange is insertable beneath said lower face between the lower face and the combine belt's upper face when the base-strip element is mounted on the combine belt's upper face.

2. A combine detachable tooth device of claim 1, in which each of said base-flange and said lower face of said base-strip element are each of interlocking shapes adapted to securely interlock with one-another when the shaft is in the inserted state within the through-space hole such that the proximal portion is substantially securely fixedly held against rotary movement around its longitudinal axis within the through-space hole.

3. A combine detachable tooth device of claim 2, in which structure of said locking shape of the base-flange comprises a multi-sided peripheral edge of the base-flange such that the base-flange may be interloced at any of variable positions with the distal portion of the shaft extending axially in any of variable lateral directions.

4. A combine detachable tooth device of claim 3, in which said base-strip element is elongated laterally and bilaterally includes a second one of said through-space hole and of said open-ended slot continuous therewith providing for the mounting of paired ones of said combine tooth.

5. A combine detachable tooth device of claim 4, including a second one of said combine tooth.

6. A combine detachable tooth device of claim 5, in which said lower face includes downwardly-extending spaced-apart ridges on each of opposite sides of each of the through-space holes and the open-ended slots continuous therewith, defining therebetween mounting space receivable of a base-flange in each of the mounting spaces defined between each said spaced-apart ridges.

7. A combine detachable tooth device of claim 6, in which the interlocking structure of said base-strip element includes female-type multi-sided peripheral inner-wall structure mateably receivable of a plurality of peripheral sides of the multisided peripheral edge of the base-flange when in the inserted state when within one of said mounting spaces between one of said spaced-apart ridges.

8. A combine detachable tooth device of claim 2, in which said lower face includes downwardly-extending spaced-apart ridges on each of opposite sides of each of the through-space holes and the open-ended slots continuous therewith, defining therebetween mounting space receivable of a base-flange in each of the mounting spaces defined between each said spaced-apart ridges.

9. A combine detachable tooth device of claim 8, in which the interlocking structure of said base-strip element includes female-type multi-sided peripheral inner-wall structure mateably receivable of a plurality of peripheral sides of the multisided peripheral edge of the base-flange when in the inserted state when within one of said mounting spaces between one of said spaced-apart ridges.

10. A combine detachable tooth device of claim 1, in which said base-strip element is elongated laterally and bilaterally includes a second one of said through-space hole and of said open-ended slot continuous therewith providing for the mounting of paired ones of said combine tooth, and a second combine tooth.

* * * * *